(12) United States Patent  
Dhuse et al.

(10) Patent No.: US 10,318,549 B2  
(45) Date of Patent: Jun. 11, 2019

(54) BATCHING MODIFICATIONS TO NODES IN A DISPERSED INDEX

(71) Applicant: International Business Machines Corporation, Armonk, NY (US)

(72) Inventors: Greg R. Dhuse, Chicago, IL (US); Ilya Volvovski, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 15/816,813

(22) Filed: Nov. 17, 2017

(65) Prior Publication Data

US 2018/0075121 A1 Mar. 15, 2018

Related U.S. Application Data

(63) Continuation-in-part of application No. 15/223,707, filed on Jul. 29, 2016, now Pat. No. 10,013,471,
(Continued)

(51) Int. Cl.
*G06F 12/00* (2006.01)
*G06F 16/27* (2019.01)
(Continued)

(52) U.S. Cl.
CPC .............. *G06F 16/27* (2019.01); *G06F 3/064* (2013.01); *G06F 3/067* (2013.01); *G06F 3/0619* (2013.01);
(Continued)

(58) Field of Classification Search
CPC ........ G06F 16/27; G06F 3/067; G06F 3/0659; G06F 3/0619; G06F 3/0689;
(Continued)

(56) References Cited

U.S. PATENT DOCUMENTS 4,092,732 A 5/1978 Ouchi
5,454,101 A 9/1995 MacKay et al.
(Continued)

OTHER PUBLICATIONS

A. Albanese, J. Blomer, J. Edmonds, M. Luby and M. Sudan, "Priority encoding transmission," Foundations of Computer Science, 1994 Proceedings., 35th Annual Symposium on, Santa Fe, NM, 1994, pp. 604-612.
(Continued)

*Primary Examiner* — Mark A Giardino, Jr.
(74) *Attorney, Agent, or Firm* — Garlick & Markison; Timothy W. Markison; Patricia A. Markison

(57) ABSTRACT

A method includes queuing a plurality of changes to a hierarchical index construct including a plurality of index structures. An index structure includes a plurality of nodes and a node is dispersed storage error encoded to produce a set of encoded data slices (EDSs). The method further includes, when triggered, determining a plurality of affected nodes of the plurality of index structures based on the plurality of changes. The method further includes retrieving a threshold number of EDSs and dispersed storage error decoding the threshold number of EDSs to produce the plurality of affected nodes. The method further includes, for a change of the plurality of changes, identifying one or more nodes of the plurality of affected nodes for which the change is applicable and updating each of the one or more nodes based on the change to produce updated one or more nodes.

15 Claims, 8 Drawing Sheets

Related U.S. Application Data which is a continuation of application No. 13/959,702, filed on Aug. 5, 2013, now Pat. No. 9,424,326.

(60) Provisional application No. 61/700,691, filed on Sep. 13, 2012.

(51) Int. Cl.
| | |
|---|---|
| *H04L 29/08* | (2006.01) |
| *G06F 3/06* | (2006.01) |
| *G06F 16/178* | (2019.01) |
| *G06F 16/23* | (2019.01) |
| *G06F 13/00* | (2006.01) |
| *G06F 13/28* | (2006.01) |

(52) U.S. Cl.
CPC .......... *G06F 3/0659* (2013.01); *G06F 3/0689* (2013.01); *G06F 16/178* (2019.01); *G06F 16/2386* (2019.01); *H04L 67/1097* (2013.01)

(58) Field of Classification Search
CPC .... G06F 16/178; G06F 3/064; G06F 16/2386; H04L 67/1097
See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |

OTHER PUBLICATIONS

Chung; An Automatic Data Segmentation Method for 3D Measured Data Points; National Taiwan University; pp. 1-8; 1998.

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

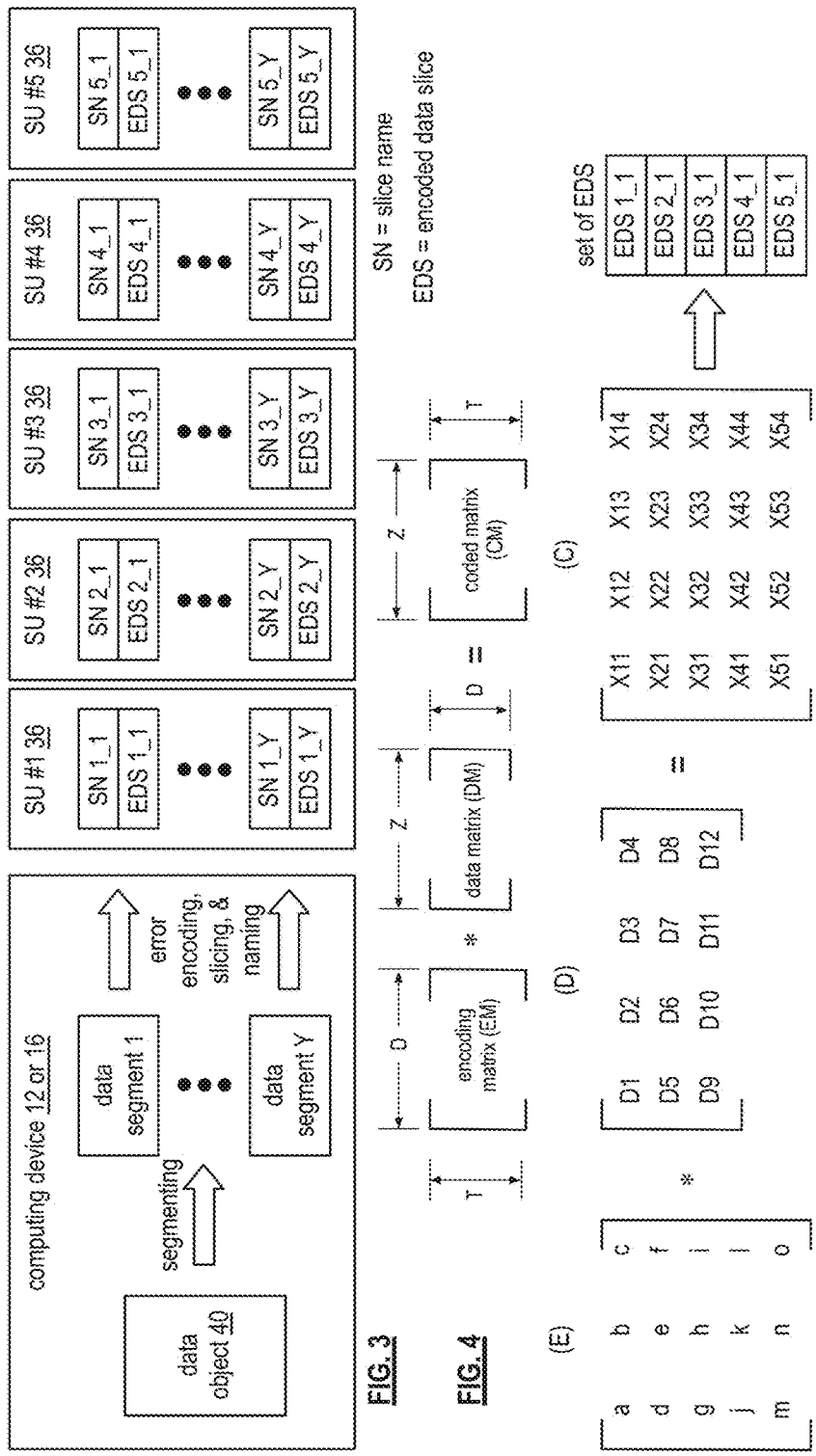

BATCHING MODIFICATIONS TO NODES IN A DISPERSED INDEX

CROSS-REFERENCE TO RELATED APPLICATIONS

This application claims priority claims pursuant to 35 U.S.C. § 120 as a continuation in part of U.S. Utility application Ser. No. 15/223,707, entitled "AVOIDING WRITE CONFLICTS IN A DISPERSED STORAGE NETWORK," filed Jul. 29, 2017, which claims priority pursuant to 35 U.S.C. § 120 as a continuation of U.S. Utility application Ser. No. 13/959,702, entitled "WRITING DATA AVOIDING WRITE CONFLICTS IN A DISPERSED STORAGE NETWORK," filed Aug. 5, 2013, which claims priority pursuant to 35 U.S.C. § 119(e) to U.S. Provisional Application No. 61/700,691, entitled "UPDATING A DISPERSED STORAGE AND TASK NETWORK INDEX", filed Sep. 13, 2012, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

It is further known that dispersed index structures are used within dispersed storage systems. Necessary updating of dispersed index structures expends system resources.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
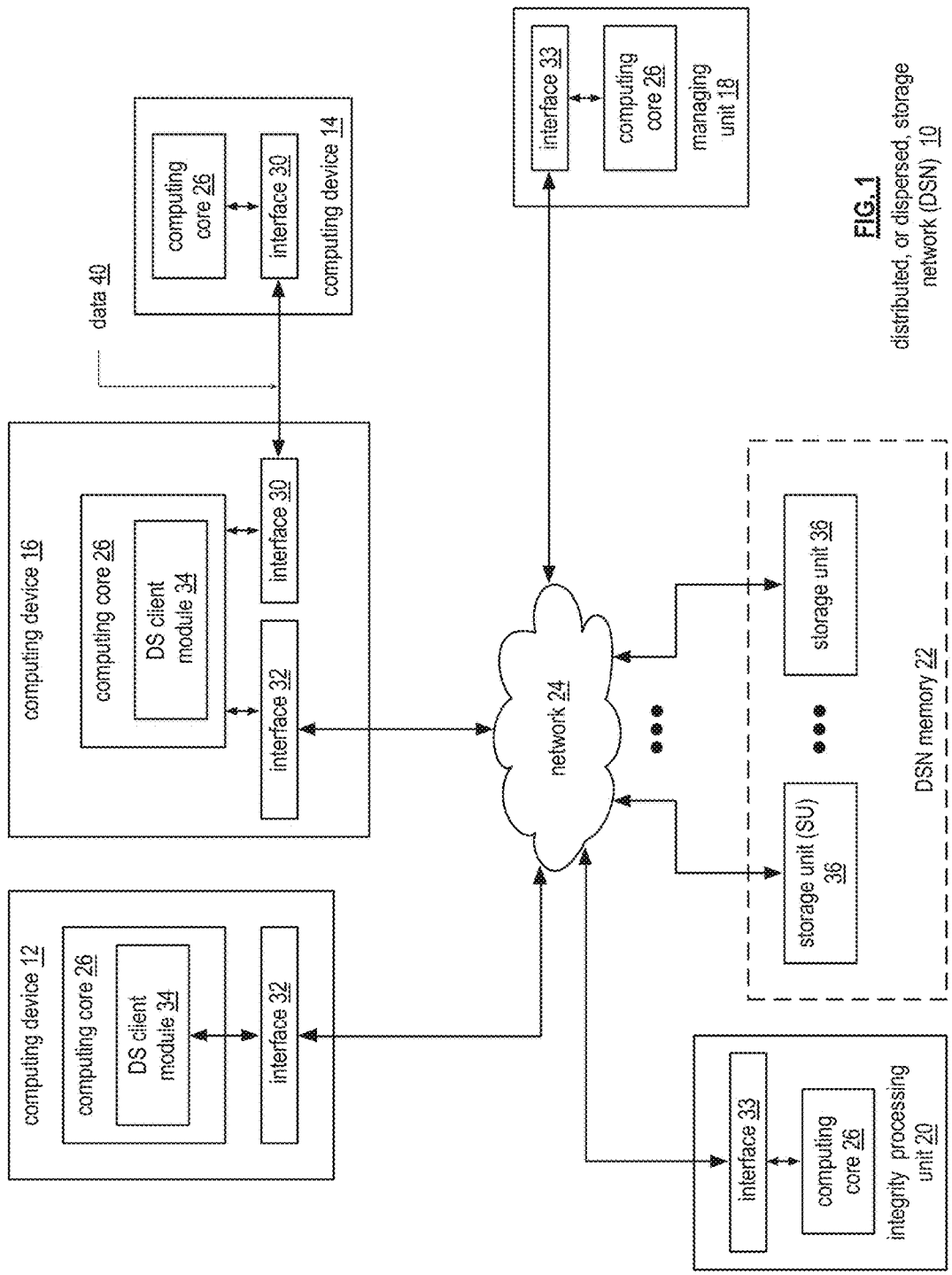
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
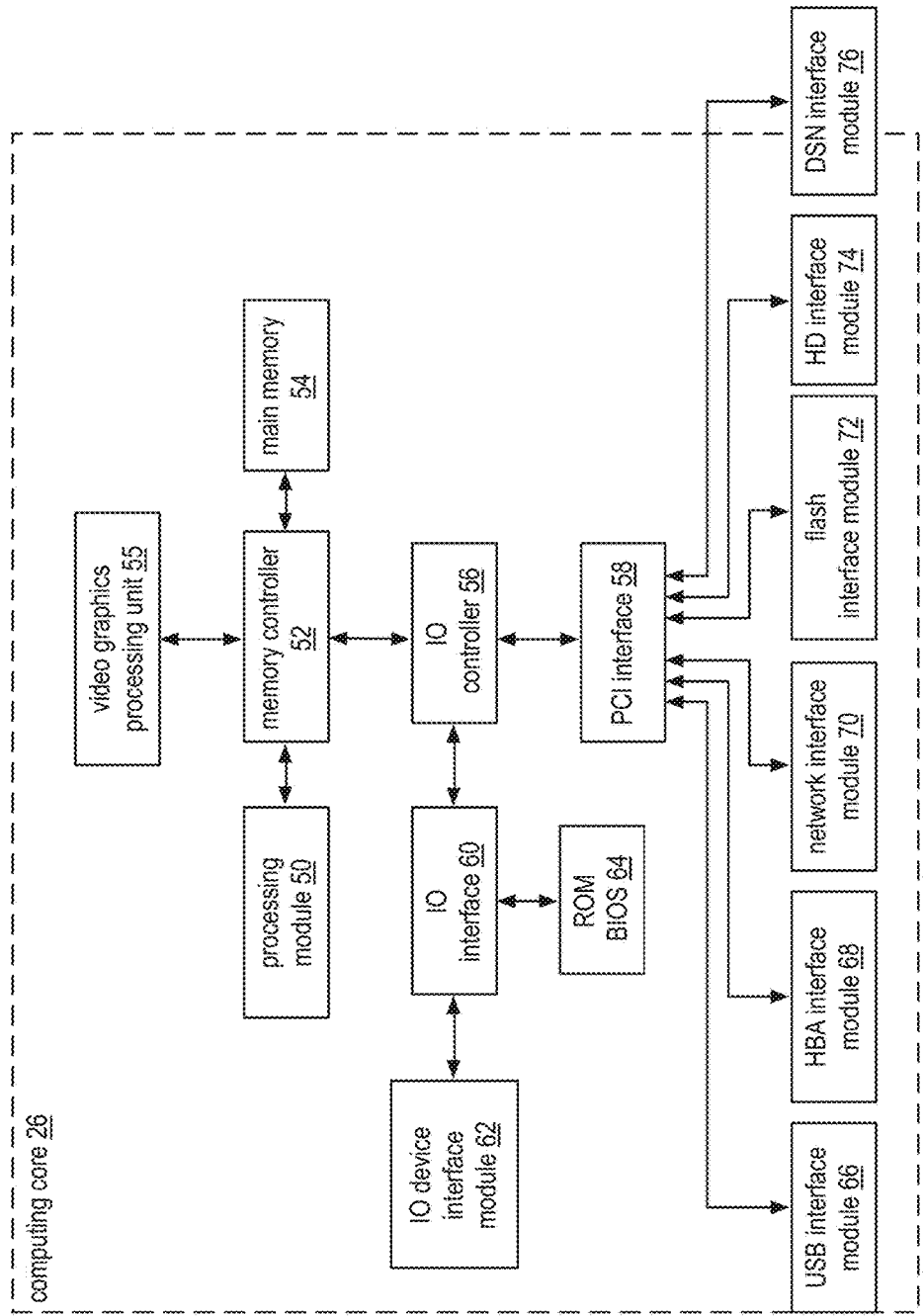
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
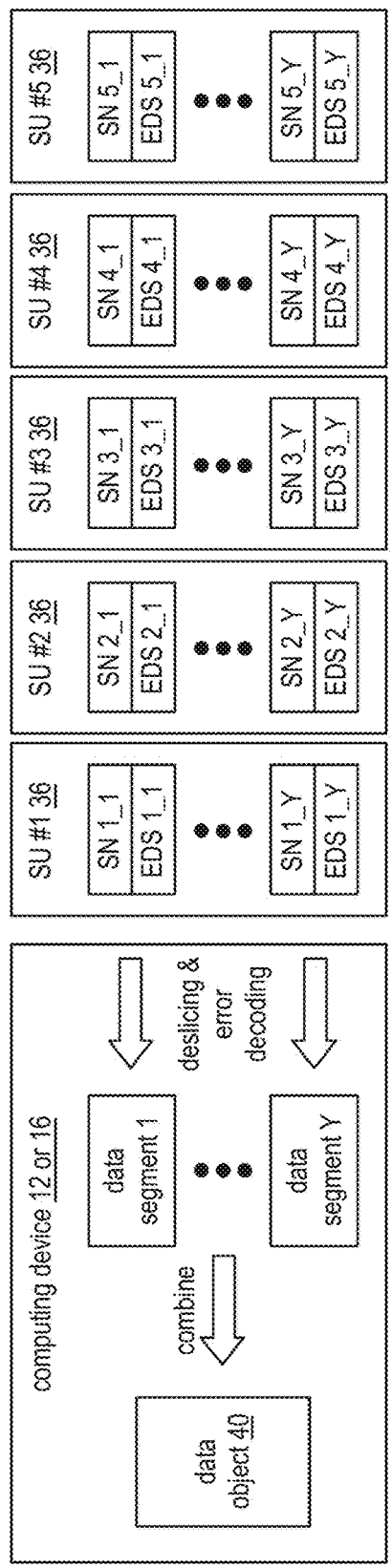
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
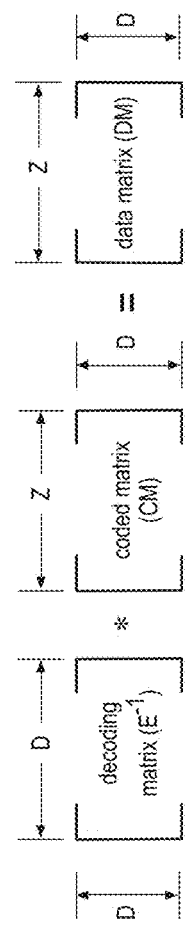
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
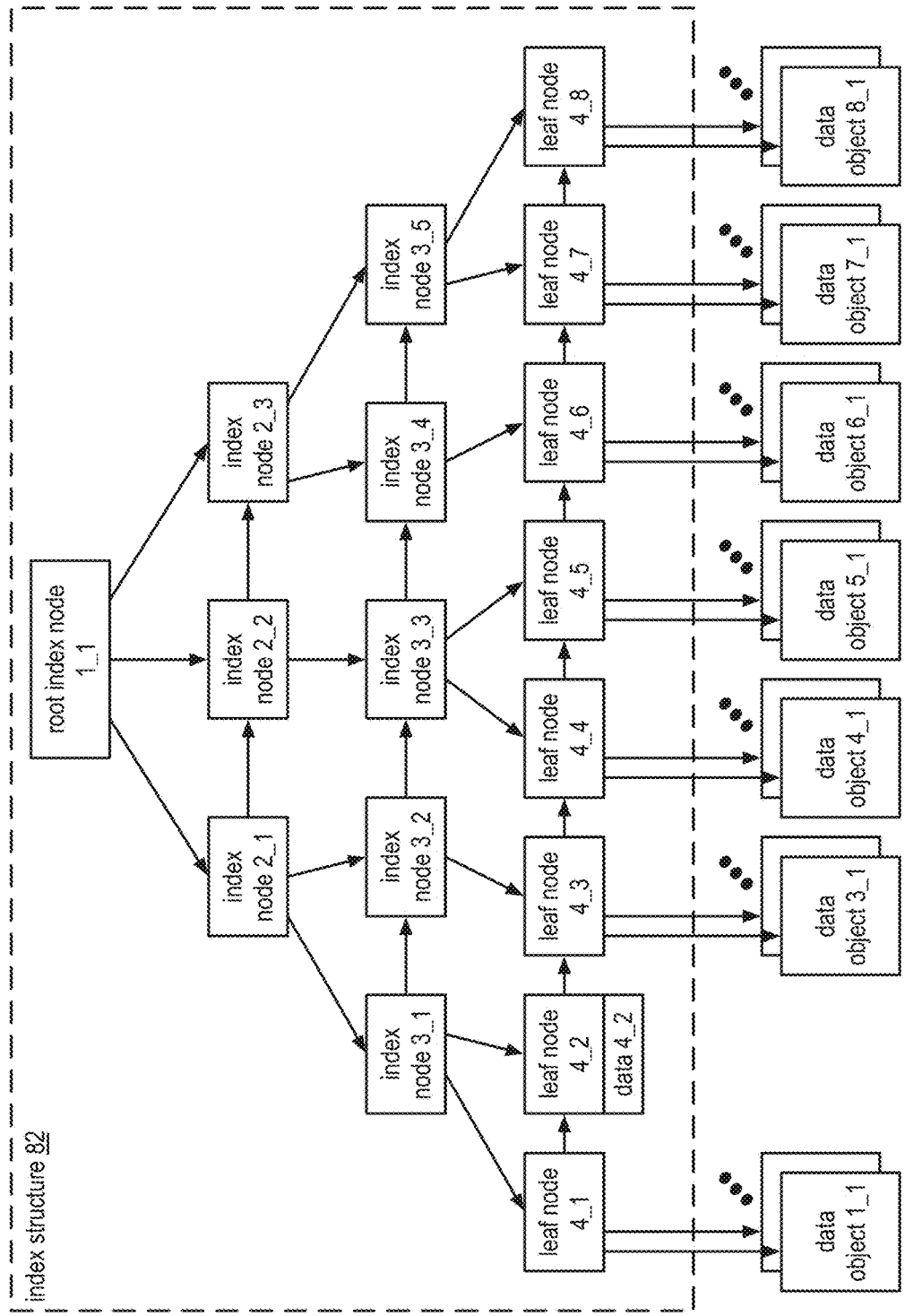
FIG. 9 is a diagram illustrating an example of a distributed index structure of one or more indexes in accordance with the present invention.

FIG. 9 is a diagram illustrating an example of a distributed index structure 82 of a plurality of index structures of a hierarchical index construct utilized to access a data object of one or more data objects 1_1 through 1_w, 3_1 through 3_w, 4_1 through 4_w, etc., where at least some of the one or more data objects are stored in a dispersed storage network (DSN), and where a data object of the one or more data objects is dispersed storage error encoded to produce a plurality sets of encoded data slices, and where the plurality of sets of encoded data slices are stored in the DSN utilizing a common source name (e.g., DSN address). The source name provides a DSN address including one or more of vault identifier (ID) (e.g., such a vault ID associates a portion of storage resources of the DSN with one or more DSN user devices), a vault generation indicator (e.g., identify a vault generation of one or more of generations), and an object number that corresponds to the data object (e.g., a random number assigned to the data object when the data object is stored in the DSN).

The distributed index structure 82 includes at least two nodes represented in the index structure as nodes associated with two or more node levels. One or more nodes of the at least two nodes of the distributed index structure 82 may be dispersed storage error encoded to produce one or more sets of encoded index slices. The one or more sets of encoded index slices may be stored in at least one of a local memory and a DSN memory. For example, each node of a 100 node distributed index structure are individually dispersed storage error encoded to produce at least 100 sets of encoded index slices for storage in the DSN memory. As another example, the 100 node index structure is aggregated into one index file and the index file is dispersed storage error encoded to produce a set of encoded index slices for storage in the DSN memory.

Each node of the at least two nodes includes at least one of an index node and a leaf node. One index node of the at least two nodes includes a root index node. Alternatively, the distributed index structure 82 includes just one node, wherein the one node is a leaf node and where the leaf node is a root node. The distributed index structure 82 may include any number of index nodes, any number of leaf nodes, and any number of node levels. Each level of the any number of node levels includes nodes of a common node type. For example, all nodes of node level 4 are leaf nodes and all nodes of node level 3 are index nodes. As another example, as illustrated, the distributed index structure 82 includes eight index nodes and eight leaf nodes, where the eight index nodes are organized in three node levels, where a first node level includes a root index node 1_1, a second node level includes index nodes 2_1, 2_2, and 2_3, and a third node level includes index nodes 3_1, 3_2, 3_3, 3_4, and 3_5, and where the eight leaf nodes are organized in a last (e.g., fourth) node level, where the last node level includes leaf nodes 4_1, 4_2, 4_3, 4_4, 4_5, 4_6, 4_7, and 4_8.

Each data object of the one more data objects is associated with at least one index key per distributed index structure of the one or more distributed indexes, where the index key includes a searchable element of the distributed index and may be utilized to locate the data object in accordance with key type traits. An index key type of an index key includes a category of the index key (e.g. string integer, etc.). An index key type exhibits traits. Each index key is associated with one or more key type traits (e.g., for an associated index structure), where a key type traits includes one or more of a type indicator, a trait indicator, a comparing function (e.g., defining how an associate index key of this type should be compared, such as sorting and/or manipulation, to other such index keys), a serialization function (e.g., encoding function for storage), a de-serialization function (e.g., decoding function for retrieval), and an absolute minimum value of the index key.

Each leaf node of the at least two nodes may be associated with one or more data objects. The association includes at least one of, for each data object of the one more data objects, storing an index key associated with the data object in the leaf node, storing a source name associated with the data object in the leaf node, and storing the data object in the leaf node. For example, leaf node 4_2 includes a data object 4_2 and an index key associated with data object 4_2. As another example, leaf node 4_3 includes source names associated with data object 3_1 through 3_w and index keys associated with data object 3_1 through 3_w. Each leaf node is associated with a minimum index key, where the minimum index key is a minimum value of one or more index keys associated with the one or more data objects in accordance with the key type traits (e.g., sorted utilizing a comparing function of the key type traits to identify the minimum value).

Each leaf node is a child in a parent-child relationship with one index node, where the one index node is a parent in the parent-child relationship. Each child node has one parent node and each parent node has one or more child nodes. The one index node (e.g., parent node) stores a minimum index key associated with the leaf node (e.g., child node). As such, a parent node stores a minimum index key for each child node of the one or more child nodes. Two index nodes may form a parent-child relationship. In such a parent-child relationship, a parent-child node pair is represented in the index structure with a parent node of the parent-child relationship associated with a parent node level that is one level above in the index structure than a child node level associated with a child node of the parent-child relationship.

A leaf node is a sibling node of another leaf node when a minimum index key associated with the leaf node is ordered greater than a last minimum index key associated with the other leaf node, where the last minimum index key associated with the leaf node is sorted above any other last minimum index keys associated with any other lower order leaf nodes and where the minimum index key associated with the leaf node is ordered less than any other minimum index keys associated with any other higher order leaf nodes. A sibling node of a node is represented in the index structure on a common level with the node and one node position to the right. A last node on the far right of a node level has a no sibling (e.g., null sibling). All other nodes, if any, other than a last far right node, of a common node level have a sibling node. For example, leaf node 4_2 is a sibling node to leaf node 4_1, leaf node 4_3 is a sibling node to leaf node 4_2, etc., leaf node 4_8 is a sibling node to leaf node 4_7 and leaf node 4_8 has no sibling node.

Each index node of the at least two nodes may be associated with one or more child nodes. Such a child node includes at least one of another index node or a leaf node. The association includes, for each child node of the one more child nodes, storing a minimum index key associated with the child node in the index node and storing a source name associated with the child node in the index node. Each child node is associated with a minimum index key, where the minimum index key is a minimum value of one or more index keys associated with the child node (e.g., the minimum index key is a minimum value of one or more index keys associated with one or more children nodes of the child node or one or more data objects of the child node in accordance with the key type traits, sorted utilizing a comparing function of the key type traits to identify the minimum value when the child node is a leaf node). For example, index node 3_2 includes a minimum index key (e.g., of data object 3_1) and source name associated with leaf node 4_3. As another example, index node 3_3 includes a minimum index key and source name associated with leaf node 4_4 and another minimum index key and another source name associated with leaf node 4_5. As yet another example, index node 2_3 includes a minimum index key and source name associated with index node 3_4 and minimum index key and another source name associated with index node 3_5.

An index node is a sibling node of another index node when a minimum index key associated with the index node is ordered greater than a last minimum index key associated with the other index node, where the last minimum index key associated with the index node is sorted above any other last minimum index keys associated with any other lower order index nodes and where the minimum index key associated with the index node is ordered less than any other minimum index keys associated with any other higher order index nodes. For example, index node 3_2 is a sibling node to index node 3_1, index node 3_3 is a sibling node to index node 3_2, etc., index node 3_6 is a sibling node to index node 3_5 and index node 3_6 has no sibling node.

Figure 10A:
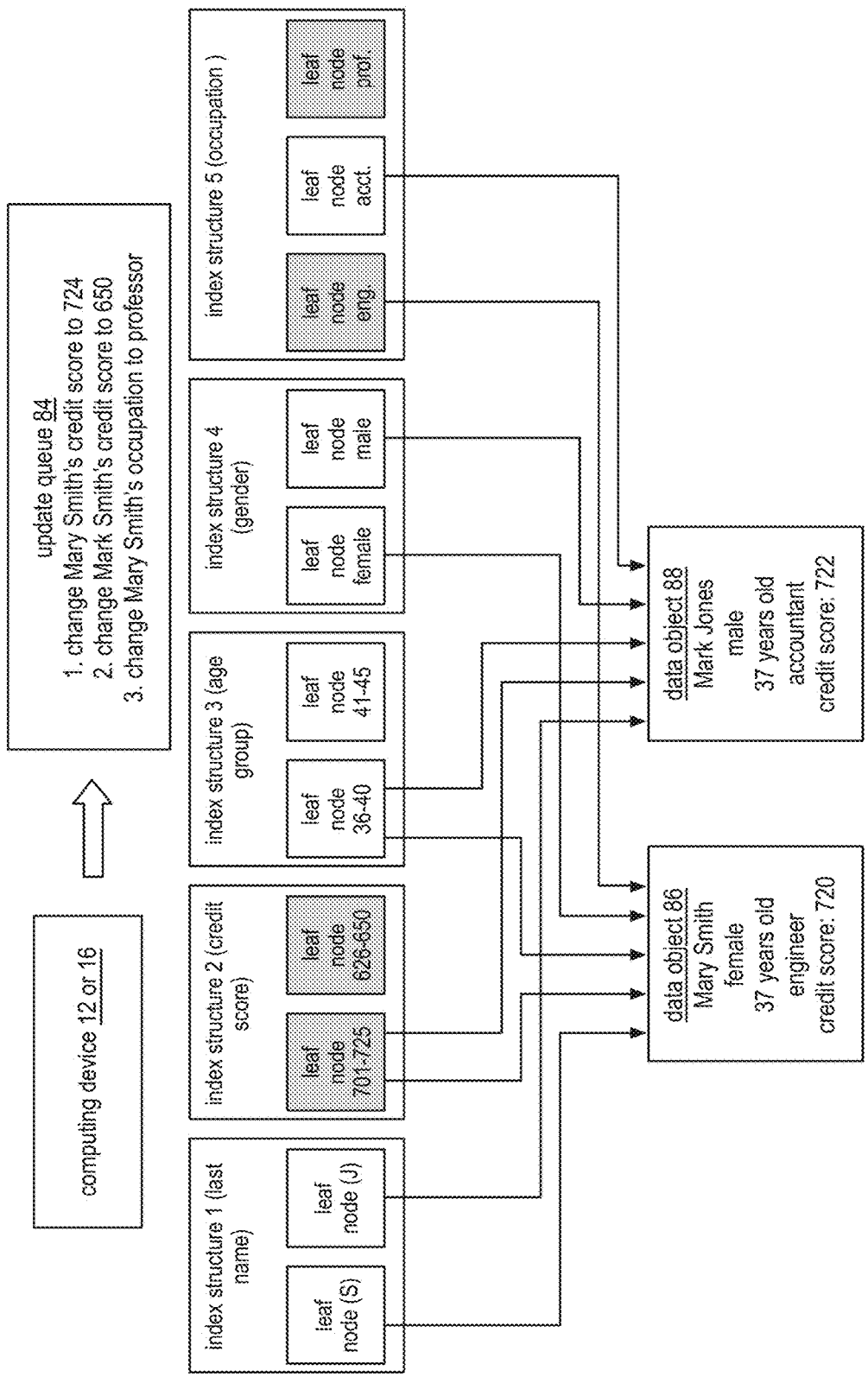
FIGS. 10A and 10B are schematic block diagrams of an example of batching changes to affected nodes of a hierarchical index construct in accordance with the present invention.
Figure 10B:
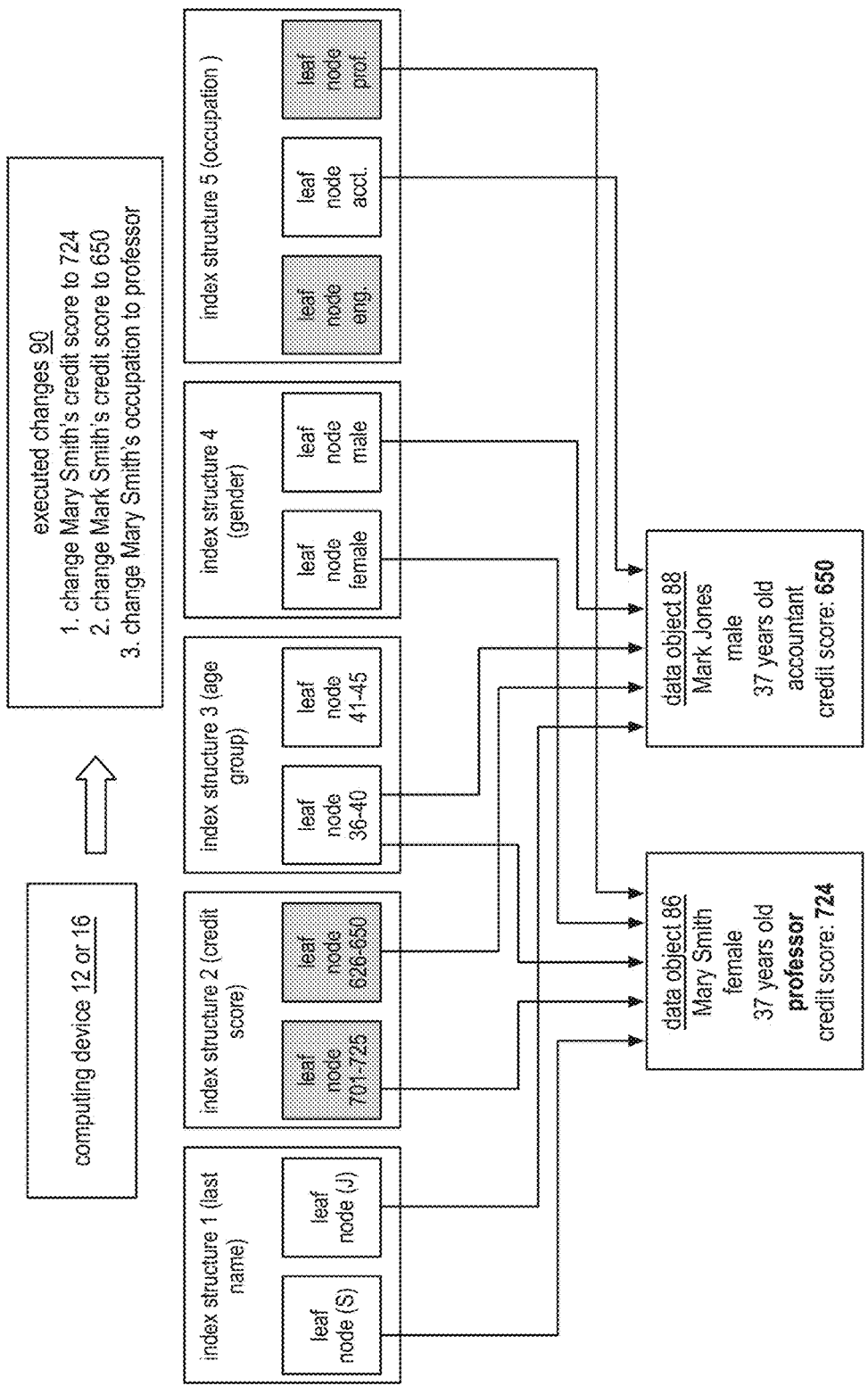

FIGS. 10A and 10B are schematic block diagrams of an example of batching changes to affected nodes of a hierarchical index construct. FIG. 10A includes a plurality of index structures 1-5 associated with data object 86 (e.g., Mary Smith's data) and data object 88 (e.g., Mark Jones' data), computing device 12 or 16, and an update queue 84. As discussed in FIG. 9, an index structure of a hierarchical index construct includes a plurality of nodes and a node of the plurality of nodes is dispersed storage error encoded to produce a set of encoded data slices. The set of encoded data slices is stored in a set of storage units of a dispersed storage network (DSN) (e.g., DSN memory). FIG. 10A depicts a plurality of index structures 1-5 associated with data relating to people (e.g., names, credit scores, age, gender, etc.). Index structure 1 is associated with last name data, index structure 2 is associated with credit score data, index structure 3 is associated with age group data, index structure 4 is associated with gender data, and index structure 5 is associated with occupation data.

Each index structure 1-5 is associated a plurality of nodes where the plurality of nodes includes a root index node, a plurality of leaf nodes, and a plurality of intervening index nodes. For simplicity, each index structure 1-5 is shown to include two or more leaf nodes. Index structure 1 includes a leaf node for last names beginning with "S" and a leaf node for last names beginning with "J." Index structure 2 includes a leaf node for credit scores between 701-725 and a leaf node for credit scores between 626-650. Index structure 3 includes a leaf node for an age group of 36-40 and a leaf node for an age group of 41-45. Index structure 4 includes a leaf node for a female gender and a leaf node for a male gender. Index structure 5 includes a leaf node for an engineer occupation, a leaf node for an accounting occupation, and a leaf node for a professor occupation.

Data object 86 contains information relating to Mary Smith who is a 37-year old female engineer with a credit score of 720. Leaf node (S) in index structure 1 (last name), leaf node 701-725 in index structure 2 (credit score), leaf node 36-40 index structure 3 (age group), leaf node female in index structure 4 (gender), and leaf node engineer in index structure 5 (occupation) are therefore associated with data object 86.

Data object 88 contains information relating to Mark Jones who is a 37-year old male accountant with a credit score of 722. Leaf node (J) in index structure 1 (last name), leaf node 701-725 in index structure 2 (credit score), leaf node 36-40 index structure 3 (age group), leaf node male in index structure 4 (gender), and leaf node accountant in index structure 5 (occupation) are therefore associated with data object 88.

Computing device 12 or 16 queues a plurality of changes to the hierarchical index construct. For example, update queue 84 includes three changes to the hierarchical index construct: 1) change Mary Smith's credit score to 724, 2) change Mark Smith's credit score to 650, and 3) change Mary Smith's occupation to professor. When triggered (e.g., after expiration of a given time period, upon receipt of a signaling event, upon completion of a prior update, etc.), computing device 12 or 16 determines a plurality of affected nodes of the plurality of index structures 1-5 based on the changes queued when triggered. Computing device 12 or 16 dispersed error decodes a threshold number of error encoded data slices for each of the plurality of affected nodes to produce the plurality of affected nodes.

For each change of the plurality of changes, computing device 12 or 16 identifies one or more nodes of the plurality of affected nodes for which the change is applicable. For example, computing device 12 or 16 identifies index structures based on pre-change data elements of data objects 86 and 88. For example, the pre-change data elements of data objects 86 and 88 relate to credit scores and occupation therefore index structure 2 (credit score) and index structure 5 (occupation) are identified. Next, computing device 12 or 16 identifies nodes within index structure 2 and index structure 5 based on the pre-change data elements. For example, leaf node 701-725 is identified based on Mark and Mary's pre-change credit scores and leaf node engineer is identified based on Mary's pre-change occupation.

Computing device 12 or 16 then identifies index structures based on a post-change data elements of data objects 86 and 88 and nodes within those index structures based on the post-change data elements. For example, the post change data elements of data objects 86 and 88 relate to credit scores and occupation therefore index structure 2 (credit score) and index structure 5 (occupation) are identified. Within those structures, leaf node 701-725 is identified based on Mary's post-change credit score, leaf node 626-650 is identified based on Mark's post-change credit score, and leaf node professor is identified based on Mary's post-change occupation.

Each of the one or more identified nodes are updated based on the changes in the update queue 84. Computing device 12 or 16 dispersed storage error encodes the updated one or more nodes to produce a threshold number of updated encoded data slices for each of the updated one or more nodes and sends the threshold number of updated encoded data slices to the storage units of the DSN for storage therein.

FIG. 10B includes the plurality of index structures 1-5 associated with data object 86 (e.g., Mary Smith's data) and data object 88 (e.g., Mark Jones' data), computing device 12 or 16, and an executed changes list 90 based on the changes executed from the update queue 84 of FIG. 10A. FIG. 10B depicts the hierarchical index construct after executed changes 90. As discussed in FIG. 10A, leaf node 701-725 of index structure 2 (credit score) has been updated. Data object 88 is no longer associated with leaf node 701-725 in index structure 2 (credit score) (to reflect executed change number 2) and data object 86 is associated with leaf node 701-725 but the score has been updated (to reflect executed change number 1). Leaf node 626-650 of index structure 2 (credit score) has been updated and is now associated with data object 88 (to reflect executed change number 2). Leaf node engineer of index structure 5 (occupation) has been updated to no longer be associated with data object 86 (to reflect executed change number 3) and leaf node professor of index structure 5 (occupation) has been updated to be associated with data object 86 (to reflect executed change number 3).

Figure 11:
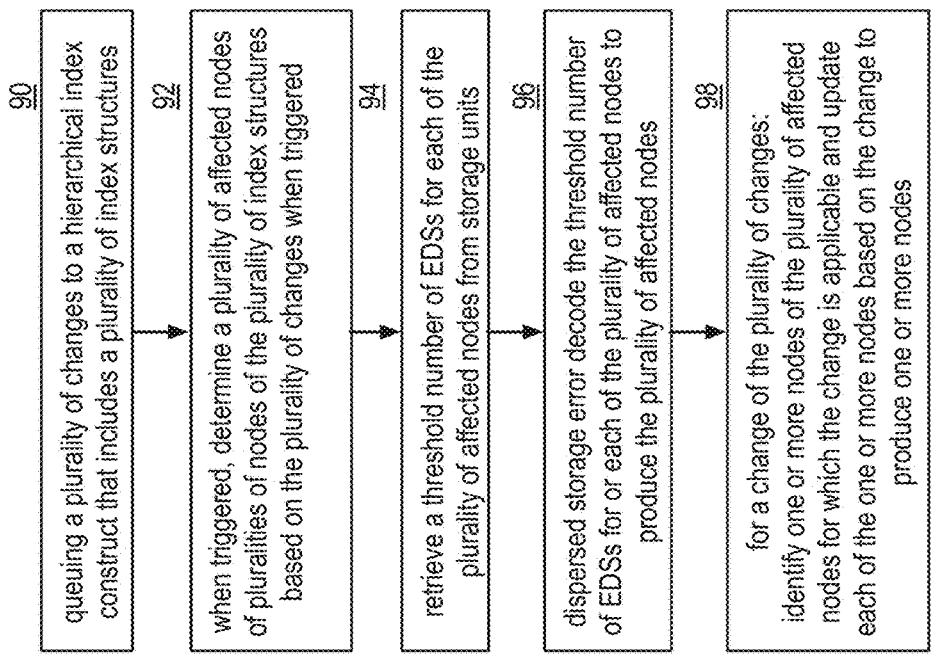
FIG. 11 is a logic diagram of an example of a method of batching changes to nodes in a dispersed index in accordance with the present invention.

FIG. 11 is a logic diagram of an example of a method of batching changes to nodes in a dispersed index. The method begins with step 90 where a computing device of a dispersed storage network (DSN) queues a plurality of changes to a hierarchical index construct (e.g., a dispersed index) that includes a plurality of index structures. An index structure of the plurality of index structures includes a plurality of nodes. The plurality of nodes includes a root index node, a plurality of leaf nodes, and a plurality of intervening index nodes. A node of the plurality of nodes is dispersed storage error encoded to produce a set of encoded data slices, and the set of encoded data slices is stored in a set of storage units of the DSN.

The method continues with step 92 where, when triggered (e.g., after expiration of a given time period, upon receipt of a signaling event, upon completion of a prior update, etc.), the computing device determines a plurality of affected nodes of pluralities of nodes of the plurality of index structures based on the plurality of changes queued when triggered. The method continues with step 94 where the computing device retrieves a threshold number of encoded data slices for each of the plurality of affected nodes from storage units of the DSN. The method continues with step 96 where the computing device dispersed error decodes the threshold number of encoded data slices for each of the plurality of affected nodes to produce the plurality of affected nodes.

The method continues with step 98 where, for a change of the plurality of changes, the computing device identifies one or more nodes of the plurality of affected nodes for which the change is applicable and updates each of the one or more nodes based on the change to produce updated one or more nodes. For a second change of the plurality of changes, the computing device identifies a second one or more nodes of the plurality of affected nodes for which the second change is applicable and updates each of the second one or more nodes based on the change to produce second updated one or more nodes.

To identify the one or more nodes of the plurality of affected nodes for which the change is applicable, the computing device first identifies a first particular index structure of the plurality of index structures and a first node of the plurality of nodes of the first particular index structure based on a pre-change data element of a data object. The computing device then identifies a second particular index structure of the plurality of index structures and a second node of the plurality of nodes of the second particular index structure based on a post-change data element of a data object.

The computing device dispersed storage error encodes the updated one or more nodes to produce a threshold number of updated encoded data slices for each of the updated one or more nodes and sends the threshold number of updated encoded data slices for each of the updated one or more nodes to the storage units for storage therein.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure)

or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:

queuing, by a computing device of a dispersed storage network (DSN), a plurality of changes to a hierarchical index construct that includes a plurality of index structures, wherein an index structure of the plurality of index structures includes a plurality of nodes, wherein a node of the plurality of nodes is dispersed storage error encoded to produce a set of encoded data slices, and wherein the set of encoded data slices is stored in a set of storage units of the DSN;

when triggered, determining, by the computing device, a plurality of affected nodes of pluralities of nodes of the plurality of index structures based on the plurality of changes queued when triggered;

retrieving, by the computing device, a threshold number of encoded data slices for each of the plurality of affected nodes from storage units of the DSN;

dispersed storage error decoding, by the computing device, the threshold number of encoded data slices for each of the plurality of affected nodes to produce the plurality of affected nodes; and for a change of the plurality of changes:

identifying, by the computing device, one or more nodes of the plurality of affected nodes for which the change is applicable; and updating, by the computing device, each of the one or more nodes based on the change to produce updated one or more nodes.

2. The method of claim 1 further comprises:

dispersed storage error encoding, by the computing device, the updated one or more nodes to produce a threshold number of updated encoded data slices for each of the updated one or more nodes; and sending, by the computing device, the threshold number of updated encoded data slices for each of the updated one or more nodes to the storage units for storage therein.

3. The method of claim 1 further comprises:

for a second change of the plurality of changes:
identifying, by the computing device, a second one or more nodes of the plurality of affected nodes for which the second change is applicable; and
updating, by the computing device, each of the second one or more nodes based on the change to produce second updated one or more nodes.

4. The method of claim 1, wherein the plurality of nodes of the index structure comprises:
a root index node;
a plurality of leaf nodes; and
a plurality of intervening index nodes.

5. The method of claim 1, wherein the identifying the one or more nodes of the plurality of affected nodes for which the change is applicable comprises:
identifying, by the computing device, a first particular index structure of the plurality of index structures based on a pre-change data element of a data object;
identifying, by the computing device, a first node of the plurality of nodes of the first particular index structure based on the pre-change data element;
identifying, by the computing device, a second particular index structure of the plurality of index structures based on a post-change data element of a data object; and
identifying, by the computing device, a second node of the plurality of nodes of the second particular index structure based on the post-change data element.

6. A computing device of a dispersed storage network (DSN), the computing device comprises:
an interface;
memory; and
a processing module operably coupled to the memory and the interface, wherein the processing module is operable to:
queue a plurality of changes to a hierarchical index construct that includes a plurality of index structures, wherein an index structure of the plurality of index structures includes a plurality of nodes, wherein a node of the plurality of nodes is dispersed storage error encoded to produce a set of encoded data slices, and wherein the set of encoded data slices is stored in a set of storage units of the DSN;
when triggered, determine a plurality of affected nodes of pluralities of nodes of the plurality of index structures based on the plurality of changes queued when triggered;
retrieve a threshold number of encoded data slices for each of the plurality of affected nodes from storage units of the DSN;

dispersed storage error decode the threshold number of encoded data slices for each of the plurality of affected nodes to produce the plurality of affected nodes; and for a change of the plurality of changes:
identify one or more nodes of the plurality of affected nodes for which the change is applicable; and
update each of the one or more nodes based on the change to produce updated one or more nodes.

7. The computing device of claim 6, wherein the processing module is further operable to:
dispersed storage error encode the updated one or more nodes to produce a threshold number of updated encoded data slices for each of the updated one or more nodes; and
send the threshold number of updated encoded data slices for each of the updated one or more nodes to the storage units for storage therein.

8. The computing device of claim 6, wherein the processing module is further operable to:
for a second change of the plurality of changes:
identify a second one or more nodes of the plurality of affected nodes for which the second change is applicable; and
update each of the second one or more nodes based on the change to produce second updated one or more nodes.

9. The computing device of claim 6, wherein the plurality of nodes of the index structure comprises:
a root index node;
a plurality of leaf nodes; and
a plurality of intervening index nodes.

10. The computing device of claim 6, wherein the processing module is operable to identify the one or more nodes of the plurality of affected nodes for which the change is applicable by:
identifying a first particular index structure of the plurality of index structures based on a pre-change data element of a data object;
identifying a first node of the plurality of nodes of the first particular index structure based on the pre-change data element;
identifying a second particular index structure of the plurality of index structures based on a post-change data element of a data object; and
identifying a second node of the plurality of nodes of the second particular index structure based on the post-change data element.

11. A computer readable memory comprises:
a first memory that stores operational instructions that, when executed by a computing device of a dispersed storage network (DSN), causes the computing device to:
queue a plurality of changes to a hierarchical index construct that includes a plurality of index structures, wherein an index structure of the plurality of index structures includes a plurality of nodes, wherein a node of the plurality of nodes is dispersed storage error encoded to produce a set of encoded data slices, and wherein the set of encoded data slices is stored in a set of storage units of the DSN;
when triggered, determine a plurality of affected nodes of pluralities of nodes of the plurality of index structures based on the plurality of changes queued when triggered;

retrieve a threshold number of encoded data slices for each of the plurality of affected nodes from storage units of the DSN;

dispersed storage error decode the threshold number of encoded data slices for each of the plurality of affected nodes to produce the plurality of affected nodes; and for a change of the plurality of changes:
identify one or more nodes of the plurality of affected nodes for which the change is applicable; and update each of the one or more nodes based on the change to produce updated one or more nodes.

12. The computer readable memory of claim 11, wherein the first memory further stores operational instructions that, when executed by the computing device, causes the computing device to:

dispersed storage error encode the updated one or more nodes to produce a threshold number of updated encoded data slices for each of the updated one or more nodes; and send the threshold number of updated encoded data slices for each of the updated one or more nodes to the storage units for storage therein.

13. The computer readable memory of claim 11, wherein a second memory that stores operational instructions that, when executed by the computing device, causes the computing device to:

for a second change of the plurality of changes:
identify a second one or more nodes of the plurality of affected nodes for which the second change is applicable; and update each of the second one or more nodes based on the change to produce second updated one or more nodes.

14. The computer readable memory of claim 11, wherein the plurality of nodes of the index structure comprises:
a root index node;
a plurality of leaf nodes; and
a plurality of intervening index nodes.

15. The computer readable memory of claim 11, wherein the first memory further stores operational instructions that, when executed by the computing device, causes the computing device to identify the one or more nodes of the plurality of affected nodes for which the change is applicable by:

identifying a first particular index structure of the plurality of index structures based on a pre-change data element of a data object;

identifying a first node of the plurality of nodes of the first particular index structure based on the pre-change data element;

identifying a second particular index structure of the plurality of index structures based on a post-change data element of a data object; and identifying a second node of the plurality of nodes of the second particular index structure based on the post-change data element.

* * * * *